Sept. 20, 1955      O. J. ALVAREZ      2,718,223
FLUID HEATING DEVICES
Filed May 28, 1949      3 Sheets-Sheet 1
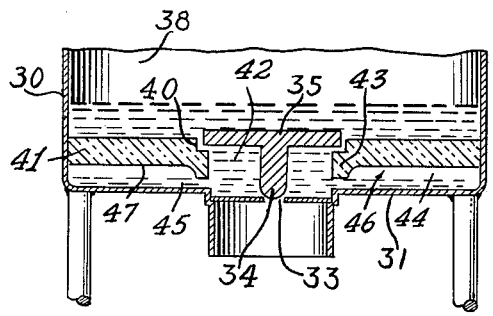
FIG. 1.
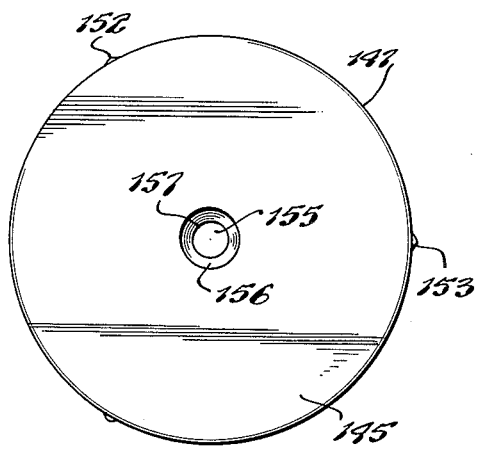
FIG. 4.
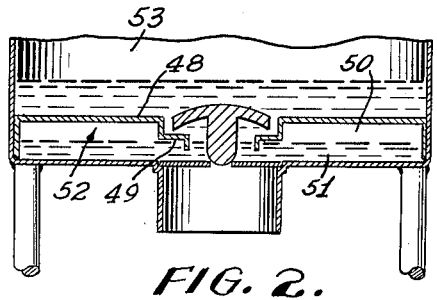
FIG. 2.
FIG. 5.
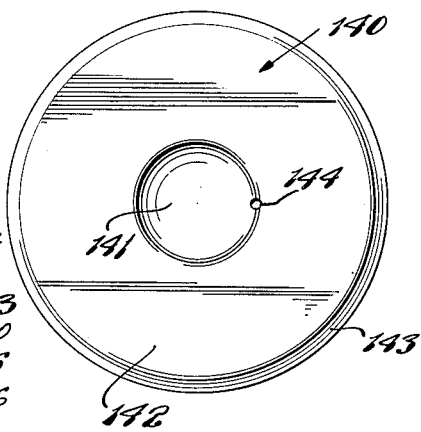
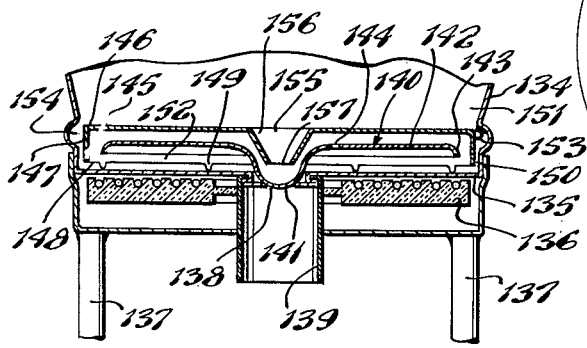
FIG. 3.
INVENTOR.
OCTAVIO J. ALVAREZ
BY Sept. 20, 1955  O. J. ALVAREZ  2,718,223
FLUID HEATING DEVICES Filed May 28, 1949  3 Sheets-Sheet 2

INVENTOR.
OCTAVIO J. ALVAREZ
BY

INVENTOR.
OCTAVIO J. ALVAREZ
BY

United States Patent Office 2,718,223
Patented Sept. 20, 1955

2,718,223

FLUID HEATING DEVICES

Octavio Jose Alvarez, New York, N. Y., assignor, by mesne assignments, of one-fourth to Maria De Reitzes-Marienwert and three-fourths to Octavio J. Alvarez, both of New York, N. Y.

Application May 28, 1949, Serial No. 96,000

21 Claims. (Cl. 126—362)

My present invention relates to devices for supplying hot fluids.

It is an object of my present invention to provide means for expediting the supply of hot fluids.

Another object of my present invention consists in providing means whereby it is possible to obtain a steady supply of hot fluid within a very short time after start of operation of my new device.

A further object of my present invention consists in a combination of automatic closure means for the outlet opening of my new heating device with the above mentioned means for expediting the supply of boiling fluid.

With the above objects in view, my new device mainly consists of a vessel, a bottom wall forming part of the cooking vessel, substantially flat heat insulating means arranged within the cooking vessel substantially parallel to the bottom wall dividing the space within the cooking vessel into an upper storage chamber and a lower storage chamber, heating means associated with the lower heating chamber for heating fluid contained in the same, an outlet opening in a lower wall portion of the cooking vessel located so as to connect the bottom portion of the lower heating chamber with the space surrounding the cooking vessel, means for closing and opening the outlet opening for preventing and permitting, respectively, flow of fluid heated within the lower heating chamber of the cooking vessel through the outlet opening, and at least one passage within the cooking vessel connecting the upper storage chamber with the lower heating chamber so as to permit flow of fluid from the upper storage chamber into the lower heating chamber whenever heated fluid leaves the lower heating chamber through the outlet opening in the wall of the cooking vessel.

A particularly preferred fluid boiling device includes in combination a cooking vessel, a bottom wall forming part of the cooking vessel, a substantially flat dividing member having a downwardly projecting rim along its edge arranged within the cooking vessel substantially parallel to the bottom wall dividing the cooking vessel into an upper storage chamber and a lower heating chamber, and creating a heat insulating flat air space between the upper storage chamber and the lower heating chamber, heating means associated with the lower heating chamber for heating fluid contained in the same, an outlet opening in said bottom wall having an edge surrounding it, a closure member freely liftably seated within the heating chamber on the edge of said outlet opening so as to close the same when in seated position and to permit passage of fluid therethrough when in lifted position, a substantially flat lifting member secured to the closure member and extending in seated position of the closure member substantially parallel to the bottom wall so as to be adapted to be automatically lifted by fluid boiling in the lower heating chamber, lifting also in this event the closure member and permitting pasasge of fluid through the outlet opening, a downwardly extending rim along the edge of the flat lifting member, a small air passage through the flat lifting member, at least one fluid passage within the cooking vessel connecting the upper storage chamber with the lower heating chamber at a point located under the downwardly projecting rim of the substantially flat dividing member so as to permit flow of fluid from the upper storage chamber into the lower heating chamber while maintaining the heat insulating flat air space between the chambers, whenever heated fluid leaves the lower heating chamber through the outlet opening, at least one opening in the substantially flat dividing member, a downwardly extending rim on the substantially flat dividing member secured to the same along the edge of the opening so as to reach downwardly to a point located above the lower end of the fluid passage, and a cup-shaped depression formed in the upper face of the substantially flat lifting member in such a manner that said downwardly extending rim on the substantially flat dividing member reaches into it.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Figs. 1 and 2 are vertical sections through different embodiments of my present invention, including heat insulating means between the upper part and the lower part of the heating vessel, and automatic means for opening the outlet opening of the vessel;

Fig. 3 is a particularly preferred embodiment of my present invention, in vertical section;

Fig. 4 is a top view of the dividing member forming part of the arrangement shown in Figure 3;

Fig. 5 is a top view of the closure member forming part of the arrangement shown in Figure 3;

Figure 6:
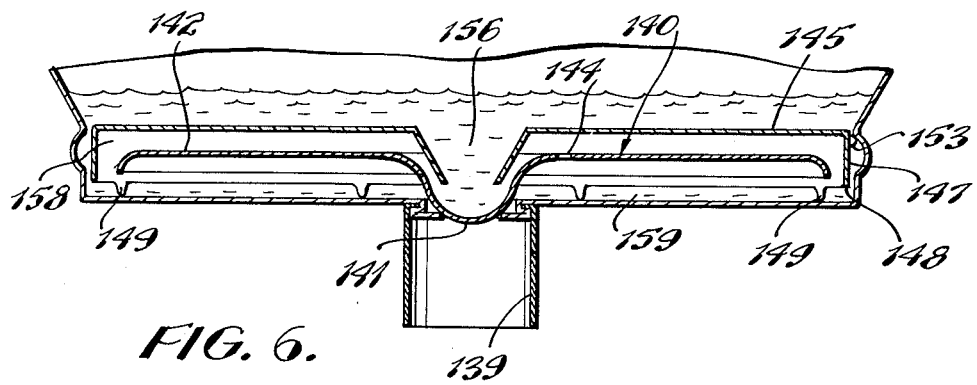
Figs. 6 to 8 are schematic drawings of the device shown in Figures 3 to 5 during various stages of operation.

One of the main features of a fluid heating device according to my present invention is the provision of heat insulating means arranged in the heating vessel parallel to the bottom thereof so as to form a lower heating chamber, and an upper storage chamber for the fluid.

It is evident that by an arrangement of this type it is possible to heat the fluid in the heating chamber within a very short time to boiling temperature, and thereby obtain a very fast supply of boiling fluid after start of operation.

In the arrangement shown in Figure 1, the heating vessel 30 is provided with a bottom wall 31, under which an electric heating coil (not shown) is arranged.

In the bottom wall of the heating vessel the outlet opening 33 is provided.

This outlet opening is kept closed by the closure member 34 seated on the edge of opening 33, and provided at its upper end with a lifting plate 35.

This lifting plate 35 is raised by the boiling water boiling under it so that during such raising the closure member 34 is lifted from the opening 33. Closure arrangements for fluid heating devices of this type are described in my co-pending U. S. patent application, Serial No. 784,498, filed by Robert E. Fulton, Jr., and myself, on November 6, 1947, and now matured into U. S. Patent 2,523,261 which issued on September 26, 1950.

In accordance with one embodiment of my present invention, I provide as heat insulating means of the above type, a relatively thick heat insulating plate 41 arranged as shown, and dividing the heating vessel into a lower heating chamber 46 and an upper storage chamber 38. This heat insulating plate is provided with a central opening 42 being slightly larger than the lifting plate 35 so as to form a canyon-shaped annular slot 40 between its annular wall and the plate 35.

In this arrangement the water permanently penetrates through the slot 40 from the upper storage compartment into the lower heating compartment 46, and is heated in the latter. The moment the water starts to boil in the heating compartment 46—while the water in the storage compartment is still cold—the boiling water and the air bubbles created by the same will vibrate the lifting plate 35 together with the closure member 34 in vertical direction, thereby intermittently opening the outlet opening 33, and permitting escape of boiling water through this opening.

It is evident that with an arrangement of this type it is possible to obtain a supply of hot water within a very short time after start of operation of the device.

The heat insulating plate 41 is provided around the opening 42 with a downwardly projecting rim 43 creating a flat air layer 44 between the water 45 in the chamber 46, and the lower face 47 of the heat insulating plate 41. This air layer serves as heat insulation.

In the arrangement shown in Figure 2, I use for heat insulating purposes between the water in the heating chamber, and the water in the storage chamber only the thin partition wall 48 provided with the rim 49 and creating the air layer 50.

I have found that such an air layer insulates so well that I am able to make the partition wall 48 even out of metal, and still, boiling of water 51 in the heating chamber 52 will leave the water in the storage chamber nearly unaffected.

In the above described embodiments I have shown automatic means for opening the outlet openings of the heating vessel. I wish to stress, however, that it is possible, also, to combine my new heating arrangement with non-automatic, manually, or otherwise operated closure means.

In the arrangement shown in Figures 3 to 5, I combine the main features of the above described embodiments.

In this device the heating vessel 134 is provided with a bottom wall 135 under which the electric heating element 136 is arranged. The device is supported by legs 137.

In the bottom wall 135 the outlet opening 138 is provided. This outlet opening 138 is surrounded by the conduit 139 as shown.

The closure member 140—a top view of which is shown in Figure 5—is seated with its cup-shaped closure extension 141 on the outlet opening 138 closing the same.

A lifting plate 142 forms part of the closure member 140 and extends, in seated position, substantially parallel to the bottom wall 135. Along the edge of the lifting plate 142 the downwardly extending rim 143 is provided for the purposes described above.

In order to permit those air bubbles to escape which form before boiling, under the lifting plate 142, I provide the escape opening 144. The size of this hole 144 determines the moment of raising of the lifting plate 142 and of the cup-shaped closure extension 141 secured thereto: Namely, if the hole 144 is smaller, the lifting plate and its closure extension will be raised already by slight boiling while if the hole is large, it will take intense boiling to raise the plate. Consequently if the hole is small, the temperature of the supplied water will be lower, while if the hole is large, its temperature will be higher.

In addition to this closure member I provide the partition wall 145, top view of which is shown in Figure 4. This partition wall 145 is provided along its edge 146 with a downwardly extending annular rim 147 provided at its bottom edge 148 with a few supporting projections 149. It should be noted that the diameter of this annular rim 147 is slightly smaller than the diameter of the vessel 134 so as to leave an annular passage 150 through which cold water can pass from the storage chamber 151 into the heating chamber 152.

Small projections 153 are provided on the annular rim 147 of the partition wall 145, engaging a corresponding annular groove 154 in the wall of the vessel 134, so as to prevent unintentional raising of the partition wall 145 by air and steam accumulating under it.

In the center of the partition wall 145 the opening 155 is provided. This opening 155 is surrounded by the funnel-shaped extension 156 reaching into the cup-shaped closure extension 141 of the closure member 140 as shown. It should be stressed that the bottom edge 157 of the funnel-shaped extension 156 is located above the plane in which the bottom edge 148 of the annular rim 147 is located.

Figure 7:
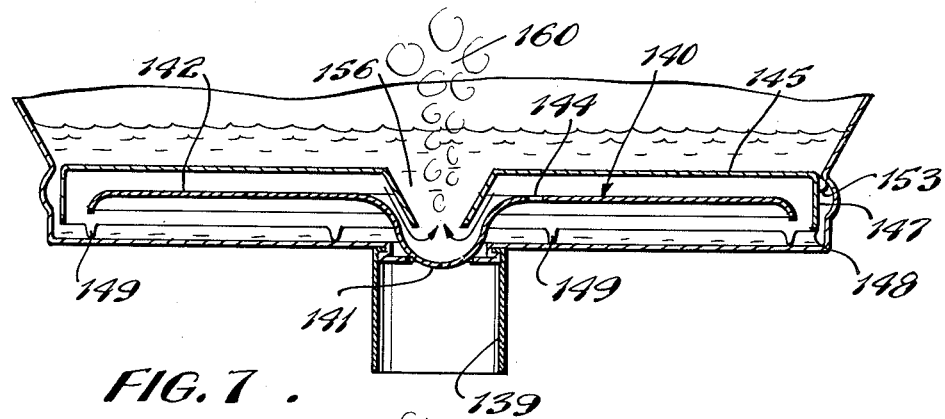
Figure 8:
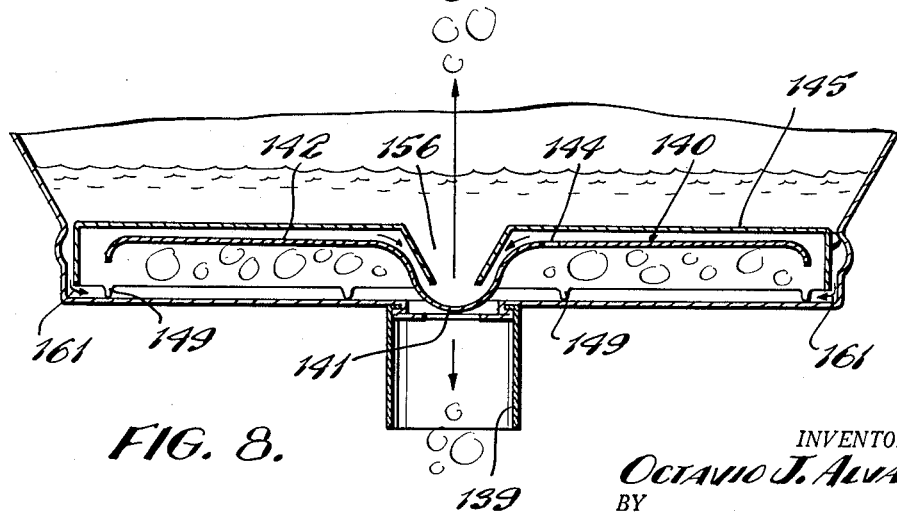

Operation of the arrangement shown in Figures 3 to 5 will be evident from the schematic showing of Figures 6 to 8.

Before start of operation, the closure member 140 and the partition wall 145 are placed in the position shown in Figure 3: Then water is poured into the vessel 134 as shown in Figure 6. As clearly visible in this figure, the entire space from the bottom edge 148 of the annular rim 147 to the partition wall 145 is filled with air 158. However, on the bottom of the heating compartment there will be a thin layer 159 of water.

It should be noted that in this condition also the funnel-shaped extension 156 of the partition wall 145, and the space within the cup-shaped closure extension 141 are filled with water.

Then the heating element 136 is connected to a source of current, and the thin water layer 159 is heated. The created stream and the expanding air in the closed space 158 will be forced to escape. Such escape will, of course, be possible only through the cup-shaped extension 141, and the funnel-shaped extension 156 since the bottom edge of the latter is located at a higher level than the bottom edge 148 of the annular rim 147. The steam and the expanding air will, therefore, escape as indicated in Figure 7 by numeral 160.

During such operation however, steam will accumulate under the lifting plate 142, and—since the passage of such steam through opening 144 is limited—the accumulated steam will raise the plate together with the closure extension 141. During such raising, of course, the air between the partition wall 145 and plate 142 will be compressed and forced to escape through the funnel-shaped extension 156, as clearly shown in Figure 8.

Simultaneously, the outlet opening 138 will be opened and the hot water escape through the same.

At the same time, due to escape of the hot water, cold water will stream through the annular slot 150 in direction of arrow 161 into the heating chamber replacing the hot water escaping through the outlet opening 138.

Such admittance of cold water will, in turn, result in condensation of the steam under the lifting plate 142, causing the same to return into the closing position shown in Figure 6. Then the cycle of heating of water, lifting of the closure member, escape of hot water, admittance of cold water and lowering of the closure member starts again.

Figure 9:
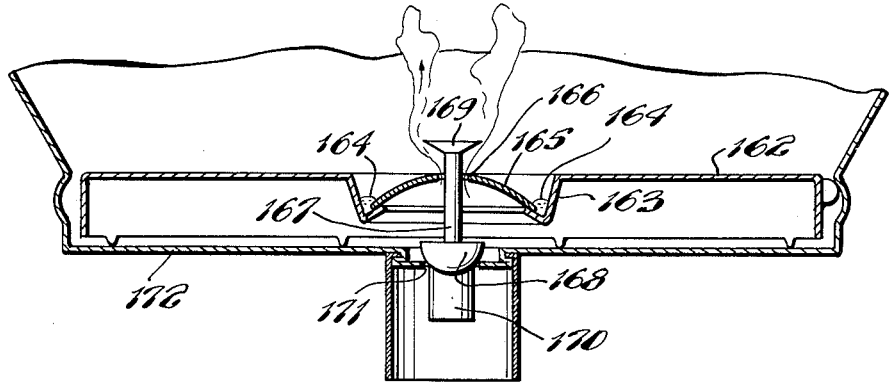
Figs. 9 to 11 are vertical sections through a further modification.
Figure 10:
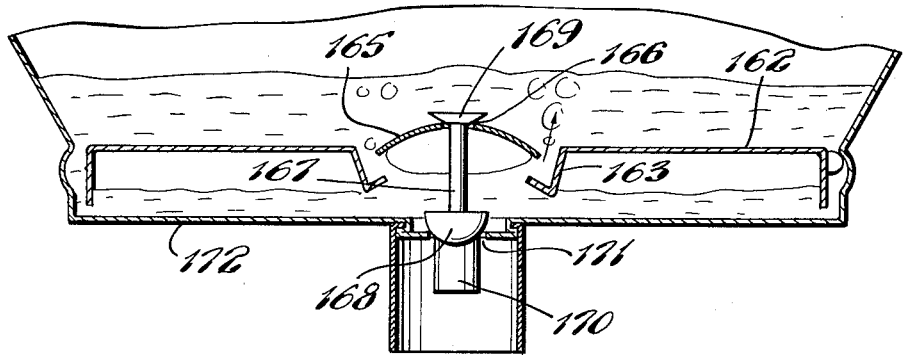
Figure 11:
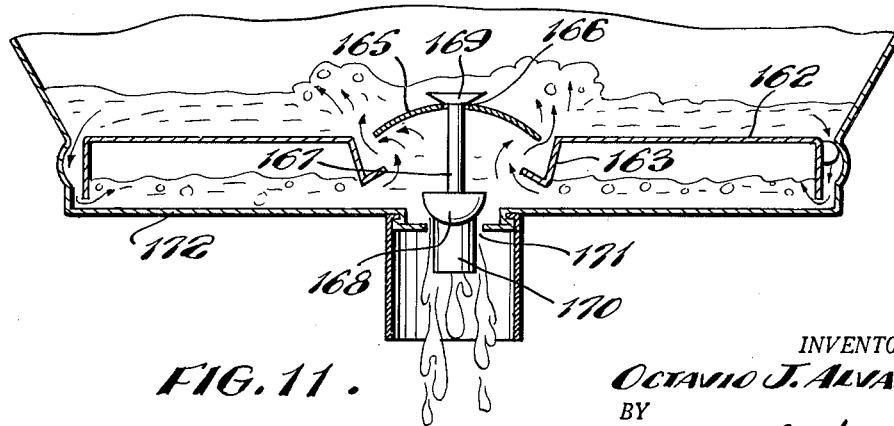

In the embodiment of Figs. 9–11 the partition wall 162 is similar in construction to the partition wall 145 shown in Figures 6 to 8, the only difference being that instead of the funnel-shaped extension 156 of the partition wall 145, I provide a ring-shaped channel member 163 being open on the top so as to be adapted to retain water as indicated by 164 when the vessel is nearly dry towards the end of operation.

Into this ring-shaped channel fits the lifting member 165 seated therein as shown in Figure 9.

In the center of the lifting member I provide an opening 166 which has a slightly larger cross-section than the cross-section of the stem 167 secured to the hemispherical closure member 168. The stem 167 is freely slidable within the opening 166 and provided at its upper end with an enlarged valve-like end portion 169 as shown in Figure 9, adapted to close the opening 166 when seated upon the same.

The hemispherical closure member 168 is provided at its bottom with a cylindrical extension 170 having a cross-section which is slightly smaller than the cross-section of the outlet opening 171 of the vessel 172.

The above described modification includes a number of particular features of great importance, namely:

1. The ring-shaped channel 163 in combination with the lifting member 165 form a liquid seal along the edge of the lifting member retaining liquid and hereby forming a complete seal between the partition wall 162 and the lifting member 165 when the same is in seated position.

2. The provision of a permanent escape opening 166 around stem 167 permits escape of air and steam after actual boiling of the water under the partition wall 162 so that the lifting member 165 and stem 167 together with the closure member 168 are lifted only at the moment the pressure of steam formed under the partition wall 162 is actually lifting it. The permanent opening 166 permits the chamber under the wall 162 to dry out after operation. Without this vent, the lifting member 165 would vibrate for considerable time and cause afterdripping.

3. The slidable connection of lifting member 165 and 167 cause an impact action during raising of the lifting member 165 so that stem 167 together with closure member 168 is momentarily lifted whenever the water is boiling under the partition wall 162.

4. The provision of the cylindrical extension 170 permits passage only of a limited amount of boiling water during lifting of the closure member 168 without danger of formation of a water film covering the outlet opening 171 and preventing flow of water if the outlet opening is small.

5. It should also be stressed that the provision of the movable stem 167 within the opening 166 prevents formation of a water film covering the opening 166, thereby keeping the same permanently open and permitting escape of air and steam.

6. Finally, it should be stressed that the independent arrangement of the closure member 168 and lifting member 165 permit proper seating of these members on their seats so as to prevent in inoperative position not only passage of water through the outlet opening 171, but also passage of steam and air along the edge of the lifting member 165.

In Figure 9, I have shown the device in inoperative position with both the closure member 169 and the lifting member 165 in closing position, and the annular opening 166 around stem 167 in open position.

When due to heating, air under wall 162 expands, the created water bubbles will lift the lifting plate 165 into its position shown in Figure 10 closing the opening 166 while permitting escape of air and steam along the rim of the plate 165. In this position the closure member 168 is still in closed position.

When the entire amount of water under the partition wall 162 boils, the created steam will force the water under wall 162 to lift the lifting plate 165 into its position shown in Figure 11, resulting in lifting of stem 167 and closure member 168, and permitting a continuous flow of boiling water through outlet opening 171 along the cylindrical member 170.

It will be understood that each of the elements described above, or two or more together, may also find a useful application in other types of fluid heating arrangements, differing from the types described above.

While I have illustrated and described the invention as embodied in water boiling devices, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic, or specific aspects of this invention, and, therefore, such adaptations should and are intended to be comprehended within the meaning and range of equivalence of the following claims.

What I claim as new and desire to secure by Letters Patent is:

1. A device for supplying hot fluid including in combination, a vessel; a bottom wall forming part of said vessel; a substantially flat dividing member having a downwardly projecting rim along its edge arranged within said vessel substantially parallel to said bottom wall dividing said vessel into an upper storage chamber and a lower heating chamber and creating a heat insulating flat air space between said upper storage chamber and said lower heating chamber when liquid in the latter is heated; heating means associated with said lower heating chamber for heating fluid contained in the same; an outlet opening in said bottom wall having an edge surrounding it; a closure member freely liftably seated within said heating chamber on said edge of said outlet opening so as to close the same when in seated position and to permit passage of fluid therethrough when in lifted position; lifting means combined with said closure member constructed so as to be adapted to be automatically lifted by fluid boiling in said lower heating chamber; and conduit means within said vessel connecting said upper storage chamber with a portion of said lower heating chamber located beneath and spaced from said dividing member so as to permit flow of fluid from said upper storage chamber into said lower heating chamber, whenever heated fluid leaves said lower heating chamber through said outlet opening.

2. A device for supplying hot fluid including in combination, a vessel; a bottom wall forming part of said vessel; a substantially flat dividing member having a downwardly projecting rim along its edge arranged within said vessel substantially parallel to said bottom wall dividing said vessel into an upper storage chamber and a lower heating chamber and creating a heat insulating flat air space between said upper storage chamber and said lower heating chamber when liquid in the latter is heated; heating means associated with said lower heating chamber for heating fluid contained in the same; an outlet opening in said bottom wall having an edge surrounding it; a closure member freely liftably seated within said heating chamber on said edge of said outlet opening so as to close the same when in seated position and to permit passage of fluid therethrough when in lifted position; a substantially flat lifting member secured to said closure member and extending in seated position of said closure member substantially parallel to said bottom wall so as to be adapted to be automatically lifted by fluid boiling in said lower heating chamber lifting also in this event said closure member and permitting passage of fluid through said outlet opening; and conduit means within said vessel connecting said upper storage chamber with a portion of said lower heating chamber located beneath and spaced from said dividing member so as to permit flow of fluid from said upper storage chamber into said lower heating chamber, whenever heated fluid leaves said lower heating chamber through said outlet opening.

3. A device for supplying hot fluid including in combination, a vessel; a bottom wall forming part of said vessel; a substantially flat dividing member having a downwardly projecting rim along its edge arranged within said vessel substantially parallel to said bottom wall dividing said vessel into an upper storage chamber and a lower heating chamber and creating a heat insulating flat air space between said upper storage chamber and said lower heating chamber when liquid in the latter is heated; heating means associated with said lower heating chamber for heating fluid contained in the same; an outlet opening in said bottom wall having an edge surounding it; a closure member freely liftably seated within said heating chamber on said edge of said outlet opening so as to close the same when in seated position and to permit passage of fluid therethrough when in lifted position; a substantailly flat lifting member secured to said closure member and extending in seated position of said closure member substantially parallel to said bottom wall so as to be adapted to be automatically lifted by fluid boiling in said lower heating chamber lifting also in this event said closure member and permitting passage of fluid through said outlet opening; a downwardly extending rim along the edge of said flat lifting member; a small air passage through said flat lifting member; and conduit means within said vessel connecting said upper storage chamber with a portion of said lower heating chamber located beneath and spaced from said dividing member so as to permit flow of fluid from said upper storage chamber into said lower heating chamber, whenever heated fluid leaves said lower heating chamber through said outlet opening.

4. A device for supplying hot fluid including in combination, a vessel; a bottom wall forming part of said vessel; a substantially flat dividing member having a downwardly projecting rim along its edge arranged within said vessel substantially parallel to said bottom wall dividing said vessel into an upper storage chamber and a lower heating chamber and creating a heat insulating flat air space between said upper storage chamber and said lower heating chamber when liquid in the latter is heated; heating means associated with said lower heating chamber for heating fluid contained in the same; an outlet opening in said bottom wall having an edge surounding it; a closure member freely liftably seated within said heating chamber on said edge of said outlet opening so as to close the same when in seated position and to permit passage of fluid therethrough when in lifted position; a substantially flat lifting member secured to said closure member and extending in seated position of said closure member substantially parallel to said bottom wall so as to be adapted to be automatically lifted by fluid boiling in said lower heating chamber lifting also in this event said closure member and permitting passage of fluid through said outlet opening; a downwardly extending rim along the edge of said flat lifting member; a small air passage through said flat lifting member; and conduit means within said vessel connecting said upper storage chamber with a portion of said lower heating chamber at a point located under said downwardly projecting rim of said substantially flat dividing member so as to permit flow of fluid from said upper storage chamber into said lower heating chamber while maintaining said heat insulating flat air space between said chambers, whenever heated fluid leaves said lower heating chamber through said outlet opening.

5. A device for supplying hot fluid including in combination, a vessel; a bottom wall forming part of said vessel; a substantially flat dividing member having a downwardly projecting rim along its edge arranged within said vessel substantially parallel to said bottom wall dividing said vessel into an upper storage chamber and a lower heating chamber and creating a heat insulating flat air passage between said upper storage chamber and said lower heating chamber when liquid in the latter is heated; heating means associated with said lower heating chamber for heating fluid contained in the same; an outlet opening in said bottom wall having an edge surrounding it; a closure member freely liftably seated within said heating chamber on said edge of said outlet opening so as to close the same when in seated position and to permit passage of fluid therethrough when in lifted position; a substantially flat lifting member secured to said closure member and extending in seated position of said closure member substantially parallel to said bottom wall so as to be adapted to be automatically lifted by fluid boiling in said lower heating chamber lifting also in this event said closure member and permitting passage of fluid through said outlet opening; a downwardly extending rim along the edge of said flat lifting member; a small air passage through said flat lifting member; conduit means within said vessel connecting said upper storage chamber with said lower heating chamber at a point located under said downwardly projecting rim of said substantially flat dividing member so as to permit flow of fluid from said upper storage chamber into said lower heating chamber while maintaining said heat insulating flat air space between said chambers, whenever heated fluid leaves said lower heating chamber through said outlet opening; at least one opening in said substantially flat dividing member; a downwardly extending rim on said substantially flat dividing member secured to the same along the edge of said opening; and means associated with said opening in said flat dividing member and said downwardly extending rim permitting passage of air from said lower heating chamber into said upper storage chamber, but preventing passage of heated fluid from said lower heating chamber into said upper storage chamber.

6. A device for supplying hot fluid including in combination, a vessel; a bottom wall forming part of said vessel; a substantially flat dividing member having a downwardly projecting rim along its edge arranged within said vessel substantially parallel to said bottom wall dividing said vessel into an upper storage chamber and a lower heating chamber and creating a heat insulating flat air space between said upper storage chamber and said lower heating chamber for heating fluid contained in the same; an outlet opening in said bottom wall having an edge surrounding it; a closure member freely liftably seated within said heating chamber on said edge of said outlet opening so as to close the same when in seated position and to permit passage of fluid therethrough when in lifted position; a substantially flat lifting member secured to said closure member and extending in seated position of said closure member substantially parallel to said bottom wall so as to be adapted to be automatically lifted by fluid boiling in said lower heating chamber lifting also in this event said closure member and permitting passage of fluid through said outlet opening; a downwardly extending rim along the edge of said flat lifting member; a small air passage through said flat lifting member; conduit means within said vessel connecting said upper storage chamber with said lower heating chamber at a point located under said downwardly projecting rim of said substantially flat dividing member so as to permit flow of fluid from said upper storage chamber into said lower heating chamber while maintaining said heat insulating flat air space between said chambers, whenever heated fluid leaves said lower heating chamber through said outlet opening; at least one opening in said substantially flat dividing member; a downwardly extending rim on said substantially flat dividing member secured to the same along the edge of said opening so as to reach downwardly to a point located above the lower end of said fluid passage; and means associated with said opening in said flat dividing member and said downwardly extending rim permitting passage of air from said lower heating chamber into said upper storage chamber, but preventing passage of heated fluid from said lower heating chamber into said upper storage chamber.

7. A device for supplying hot fluid including in combination, a vessel; a bottom wall forming part of said vessel; a substantially flat dividing member having a downwardly projecting rim along its edge arranged within said vessel substantially parallel to said bottom wall dividing said vessel into an upper storage chamber and a lower heating chamber and creating a heat insulating flat air space between said upper storage chamber and said lower heating chamber for heating fluid contained in the same; an outlet opening in said bottom wall having an edge surrounding it; a closure member freely liftably seated within said heating chamber on said edge of said outlet opening so as to close the same when in seated position and to permit passage of fluid therethrough when in lifted position; a substantially flat lifting member secured to said closure member and extending in seated position of said closure member substantially parallel to said bottom wall so as to be adapted to be automatically lifted by fluid boiling in said lower heating chamber lifting also in this event said closure member and permitting passage of fluid through said outlet opening; a downwardly extending rim along the edge of said flat lifting member; a small air passage through said flat lifting member; conduit means within said vessel connecting said upper storage chamber with said lower heating chamber at a point located under said downwardly projecting rim of said substantially flat dividing member so as to permit flow of fluid from said upper storage chamber into said lower heating chamber while maintaining said heat insulating flat air space between said chambers, whenever heated fluid leaves said lower heating chamber through said outlet opening; at least one opening in said substantially flat dividing member; a downwardly extending rim on said substantially flat dividing member secured to the same along the edge of said opening so as to reach downwardly to a point located above the lower end of said fluid passage; and a cup-shaped depression formed in the upper face of said substantially flat lifting member in such a manner that said downwardly extending rim on said substantially flat dividing member reaches into it.

8. A device for supplying hot fluid including in combination, a vessel; a bottom wall forming part of said vessel; a substantially flat dividing member arranged within said vessel substantially parallel to said bottom wall dividing said vessel into an upper storage chamber and a lower heating chamber; heating means associated with said lower heating chamber for heating fluid contained in the same; an outlet opening in the bottom wall of said vessel; an opening in said substantially flat dividing member located above said outlet opening; a downwardly extending rim on said substantially flat dividing member secured to the same along said opening so as to form a heat insulating flat air layer within said lower heating chamber under said substantially flat dividing member; an inwardly and upwardly extending ring-shaped extension along the bottom edge of said rim so as to form together with said rim a circular channel being open at its top; a liftable circular lifting member seated in said circular channel; a liftable closure member seated on the edge of said outlet opening; and a stem connecting said liftable circular lifting member with said liftable closure member so as to cause lifting of said liftable closure member when said liftable circular lifting member is lifted by creation of steam in said lower heating chamber when fluid contained therein is boiled by said heating means.

9. A device for supplying hot fluid including in combination, a vessel; a bottom wall forming part of said vessel; a substantially flat dividing member arranged within said vessel substantially parallel to said bottom wall dividing said vessel into an upper storage chamber and a lower heating chamber; heating means associated with said lower heating chamber for heating fluid contained in the same; an outlet opening in the bottom wall of said vessel; an opening in said substantially flat dividing member located above said outlet opening; a downwardly extending rim on said substantially flat dividing member secured to the same along said opening so as to form a heat insulating flat air layer within said lower heating chamber under said substantially flat dividing member; an inwardly and upwardly extending ring-shaped extension along the bottom edge of said rim so as to form together with said rim a circular channel being open at its top; a liftable circular lifting member seated in said circular channel; a small opening in the center of said liftable circular lifting member; a liftable closure member seated on the edge of said outlet opening closing the same; a stem connected to said liftable closure member and passing through said small opening in the center of said liftable circular lifting member; and a small stop member at the top of said stem adapted to engage the edge of said small opening when said liftable circular lifting member is lifted by steam created in said lower heating chamber, causing thereby lifting of said stem and said liftable closure member and thus opening the outlet opening in said bottom wall of said vessel.

10. A device for supplying hot fluid including in combination, a vessel; a bottom wall forming part of said vessel; a substantially flat dividing member arranged within said vessel substantially parallel to said bottom wall dividing said vessel into an upper storage chamber and a lower heating chamber; heating means associated with said lower heating chamber for heating fluid contained in the same; an outlet opening in the bottom wall of said vessel; an opening in said substantially flat dividing member located above said outlet opening; a downwardly extending rim on said substantially flat dividing member secured to the same along said opening so as to form a heat insulating flat air layer within said lower heating chamber under said substantially flat dividing member; an inwardly and upwardly extending ring-shaped extension along the bottom edge of said rim so as to form together with said rim a circular channel being open at its top; a liftable circular lifting member seated in said circular channel; a liftable closure member seated on the edge of said outlet opening; a stem connecting said liftable circular lifting member with said liftable closure member so as to cause lifting of said liftable closure member when said liftable circular lifting member is lifted by creation of steam in said lower heating chamber when fluid contained therein is boiled by said heating means; and an extension at the bottom of said liftable closure member passing through said outlet opening in the bottom wall of said vessel, and having a diameter which is slightly smaller than said outlet opening.

11. A device for supplying hot fluid including in combination, a vessel; a bottom wall forming part of said vessel; a substantially flat dividing member arranged within said vessel substantially parallel to said bottom wall dividing said vessel into an upper storage chamber and a lower heating chamber; heating means associated with said lower heating chamber for heating fluid contained in the same; an outlet opening in the bottom wall of said vessel; an opening in said substantially flat dividing member located above said outlet opening; a downwardly extending rim on said substantially flat dividing member secured to the same along said opening so as to form a heat insulating flat air layer within said lower heating chamber under said substantially flat dividing member; an inwardly and upwardly extending ring-shaped extension along the bottom edge of said rim so as to form together with said rim a circular channel being open at its top; a liftable circular lifting member seated in said circular channel; a small opening in the center of said liftable circular lifting member; a liftable closure member seated on the edge of said outlet opening closing the same; a stem connected to said liftable closure member and passing through said small opening in the center of said liftable circular lifting member; a small stop member at the top of said stem adapted to engage the edge of said small opening when said liftable circular lifting member is lifted by steam created in said lower heating chamber, causing thereby lifting of said stem and said liftable closure member and thus opening the outlet opening in said bottom wall of said vessel; and an extension at the bottom of said liftable closure member passing through said outlet opening in the bottom wall of said vessel, and having a diameter which is slightly smaller than said outlet opening.

12. A device for supplying a hot liquid, comprising, in combination, a vessel having a bottom wall formed with an outlet opening; partition means arranged in said vessel over and spaced from said bottom wall thereof so as to divide the interior of said vessel into a heating chamber located beneath said partition means and a liquid storing chamber located over said partition means, said partition means having a portion thereof formed with an opening passing therethrough and having a tubular portion extending about said opening and downwardly toward said bottom wall so that said chambers communicate with each other through said tubular portion of said partition means and so that when a liquid in said heating chamber is heated an insulating layer of steam will automatically be formed in said heating chamber about said tubular portion of said partition means and directly beneath said partition means; a valve member located in said heating chamber and resting by gravity on said bottom wall over said outlet opening thereof to close said outlet opening; a stem connected to said valve member and extending upwardly through said tubular portion of said partition means into said storage chamber; and lifting means located in said storage chamber about said stem over said opening of said partition means and being operatively connected to said stem for raising the latter and said valve member therewith during boiling of a liquid in said heating chamber, so that the boiling liquid will then flow out through said outlet opening in said bottom wall of said vessel.

13. A device for supplying a hot liquid, comprising, in combination, a vessel having a bottom wall formed with an outlet opening; partition means arranged in said vessel over and spaced from said bottom wall thereof so as to divide the interior of said vessel into a heating chamber located beneath said partition means and a liquid storing chamber located over said partition means, said partition means having a portion thereof formed with an opening passing therethrough and having a tubular portion extending about said opening and downwardly toward said bottom wall so that said chambers communicate with each other through said tubular portion of said partition means and so that when a liquid in said heating chamber is heated an insulating layer of steam will automatically be formed in said heating chamber about said tubular portion of said partition means and directly beneath said partition means, and said partition means having a peripheral portion spaced from a side wall portion of said vessel and extending downwardly toward said bottom wall so that liquid may flow from said storage chamber between said peripheral portion of said partition means and said side wall portion of said vessel into said heating chamber; valve means associated with said outlet opening in said bottom wall of said chamber for controlling the flow of liquid theerthrough; and means associated with said tubular portion of said partition means for preventing water from flowing downwardly through said tubular portion from said storage chamber into said heating chamber and for permitting steam to flow upwardly through said tubular portion into said storage chamber.

14. A device for supplying a hot liquid, comprising, in combination, a vessel having a bottom wall formed with an outlet opening; partition means arranged in said vessel over and spaced from said bottom wall thereof so as to divide the interior of said vessel into a heating chamber located beneath said partition means and a liquid storing chamber located over said partition means, said partition means having a portion thereof formed with an opening passing therethrough and having a tubular portion extending about said opening and downwardly toward said bottom wall so that said chambers communicate with each other through said tubular portion of said partition means and so that when a liquid in said heating chamber is heated an insulating layer of steam will automatically be formed in said heating chamber about said tubular portion of said partition means and directly beneath said partition means; a valve member located in said heating chamber and resting by gravity on said bottom wall over said outlet opennig thereof to close said outlet opening; a stem connected to said valve member and extending upwardly through said tubular portion of said partition means into said storage chamber; and lifting means located in said storage chamber about said stem over said opening of said partition means and being operatively connected to said stem for raising the latter and said valve member therewith during boiling of a liquid in said heating chamber, so that the boiling liquid will then flow out through said outlet opening in said bottom wall of said vessel, said lifting means being in the form of a plate fixed to said stem and adapted to be raised by steam passing upwardly through said tubular portion of said partition means for raising said stem and valve member therewith.

15. A device for supplying a hot liquid, comprising, in combination, a vessel having a bottom wall formed with an outlet opening; partition means arranged in said vessel over and spaced from said bottom wall thereof so as to divide the interior of said vessel into a heating chamber located beneath said partition means and a liquid storing chamber located over said partition means, said partition means having a portion thereof formed with an opening passing therethrough and having a tubular portion extending about said opening and downwardly toward said bottom wall so that said chambers communicate with each other through said tubular portion of said partition means and so that when a liquid in said heating chamber is heated an insulating layer of steam will automatically be formed in said heating chamber about said tubular portion of said partition means and directly beneath said partition means; a valve member located in said heating chamber and resting by gravity on said bottom wall over said outlet opening thereof to close said outlet opening; a stem connected to said valve member and extending upwardly through said tubular portion of said partition means into said storage chamber; and lifting means located in said storage chamber about said stem over said opennig of said partition means and being operatively connected to said stem for raising the latter and said valve member therewith during boiling of a liquid in said heating chamber, so that the boiling liquid will then flow out through said outlet opening in said bottom wall of said vessel, said lifting means comprising a plate resting on said partition means and being formed with an opening through which said stem freely extends and said lifting means including a free end portion of said stem located over said plate and being of a larger size than said opening therein so that said plate will be lifted by steam passing upwardly through said tubular portion of said partition means and will engage said free end portion of said stem to raise the latter and said valve member therewith.

16. A device for supplying a hot liquid, comprising, in combination, a vessel having a bottom wall formed with an outlet opening; partition means arranged in said vessel over and spaced from said bottom wall thereof so as to divide the interior of said vessel into a heating chamber located beneath said partition means and a liquid storing chamber located over said partition means, said partition means having a portion thereof formed with an opening passing therethrough and having a tubular portion extending about said opening and downwardly toward said bottom wall so that said chambers communicate with each other through said tubular portion of said partition means and so that when a liquid in said heating chamber is heated an insulating layer of steam will automatically be formed in said heating chamber about said tubular portion of said partition means and directly beneath said partition means, and said partition means having a peripheral portion spaced from a side wall portion of said vessel and extending downwardly toward said bottom wall so that liquid may flow from said storage chamber between said peripheral portion of said partition means and said side wall portion of said vessel into said heating chamber; a valve member located in said heating chamber and resting by gravity on said bottom wall over said outlet opening thereof to close said outlet opening; a stem connected to said valve member and extending upwardly through said tubular portion of said partition means into said storage chamber; and lifting means located in said storage chamber about said stem over said opening of said partition means and being operatively connected to said stem for raising the latter and said valve member therewith during boiling of a liquid in said heating chamber, so that the boiling liquid will then flow out through said outlet opening in said bottom wall of said vessel.

17. A device for supplying a hot liquid, comprising, in combination, a vessel having a bottom wall formed with an outlet opening; partition means arranged in said vessel over and spaced from said bottom wall thereof so as to divide the interior of said vessel into a heating chamber located beneath said partition means and a liquid storing chamber located over said partition means, said partition means having a portion thereof formed with an opening passing therethrough and having a tubular portion extending about said opening and downwardly toward said bottom wall so that said chambers communicate with each other through said tubular portion of said partition means and so that when a liquid in said heating chamber is heated an insulating layer of steam will automatically be formed in said heating chamber about said tubular portion of said partition means and directly beneath said partition means, and said partition means having a peripheral portion spaced from a side wall portion of said vessel and extending downwardly toward said bottom wall so that liquid may flow from said storage chamber between said peripheral portion of said partition means and said side wall portion of said vessel into said heating chamber; a valve member located in said heating chamber and resting by gravity on said bottom wall over said outlet opening thereof to close said outlet opening; a stem connected to said valve member and extending upwardly through said tubular portion of said partition means into said storage chamber; and lifting means located in said storage chamber about said stem over said opening of said partition means and being operatively connected to said stem for raising the latter and said valve member therewith during boiling of a liquid in said heating chamber, so that the boiling liquid will then flow out through said outlet opening in said bottom wall of said vessel, said lifting means comprising a plate resting on said partition means and being formed with an opening through which said stem freely extends and said lifting means including a free end portion of said stem located over said plate and being of a larger size than said opening therein so that said plate will be lifted by steam passing upwardly through said tubular portion of said partition means and will engage said free end portion of said stem to raise the latter and said valve member therewith.

18. A device for supplying a hot liquid, comprising, in combination, a vessel having a bottom wall formed with an outlet opening; partition means arranged in said vessel over and spaced from said bottom wall thereof so as to divide the interior of said vessel into a heating chamber located beneath said partition means and a liquid storing chamber located over said partition means, said partition means having a portion thereof formed with an opening passing therethrough and having a tubular portion extending about said opening and downwardly toward said bottom wall so that said chambers communicate with each other through said tubular portion of said partition means and so that when a liquid in said heating chamber is heated an insulating layer of steam will automatically be formed in said heating chamber about said tubular portion of said partition means and directly beneath said partition means; a valve member located in said heating chamber and resting by gravity on said bottom wall over said outlet opening thereof to close said outlet opening; a stem connected to said valve member and extending upwardly through said tubular portion of said partition means into said storage chamber; and lifting means located in said storage chamber about said stem over said opening of said partition means and being operatively connected to said stem for raising the latter and said valve member therewith during boiling of a liquid in said heating chamber, so that the boiling liquid will then flow out through said outlet opening in said bottom wall of said vessel, said lifting means comprising a plate resting on said partition means and being formed with an opening through which said stem freely extends and said lifting means including a free end portion of said stem located over said plate and being of a larger size than said opening therein so that said plate will be lifted by steam passing upwardly through said tubular portion of said partition means and will engage said free end portion of said stem to raise the latter and said valve member therewith, said plate being dished and having its concave face directed toward said partition means.

19. A device for supplying a hot liquid, comprising, in combination, a vessel having a bottom wall formed with an outlet opening; partition means arranged in said vessel over and spaced from said bottom wall thereof so as to divide the interior of said vessel into a heating chamber located beneath said partition means and a liquid storing chamber located over said partition means, said partition means having a portion thereof formed with an opening passing therethrough and having a tubular portion extending about said opening and downwardly toward said bottom wall so that said chambers communicate with each other through said tubular portion of said partition means and so that when a liquid in said heating chamber is heated an insulating layer of steam will automatically be formed in said heating chamber about said tubular portion of said partition means and directly beneath said partition means, and said partition means having a peripheral portion spaced from a side wall portion of said vessel and extending downwardly toward said bottom wall so that liquid may flow from said storage chamber between said peripheral portion of said partition means and said side wall portion of said vessel into said heating chamber; a valve member located in said heating chamber and resting by gravity on said bottom wall over said outlet opening thereof to close said outlet opening; a stem connected to said valve member and extending upwardly through said tubular portion of said partition means into said storage chamber; and lifting means located in said storage chamber about said stem over said opening of said partition means and being operatively connected to said stem for raising the latter and said valve member therewith during boiling of a liquid in said heating chamber, so that the boiling liquid will then flow out through said outlet opening in said bottom wall of said vessel, said lifting means comprising a plate resting on said partition means and being formed with an opening through which said stem freely extends and said lifting means including a free end portion of said stem located over said plate and being of a larger size than said opening therein so that said plate will be lifted by steam passing upwardly through said tubular portion of said partition means and will engage said free end portion of said stem to raise the latter and said valve member therewith, said plate being dished and having its concave face directed toward said partition means.

20. A device for supplying a hot liquid, comprising, in combination, a vessel having a bottom wall formed with an outlet opening; partition means arranged in said vessel over and spaced from said bottom wall thereof so as to divide the interior of said vessel into a heating chamber located beneath said partition means and a liquid storing chamber located over said partition means, said partition means having a portion thereof formed with an opening passing therethrough and having a tubular portion extending about said opening and downwardly toward said bottom wall so that said chambers communicate with each other through said tubular portion of said partition means and so that when a liquid in said heating chamber is heated an insulating layer of steam will automatically be formed in said heating chamber about said tubular portion of said partition means and directly beneath said partition means; valve means located in said heating chamber and resting by gravity on said bottom wall over said outlet opening thereof to close said outlet opening; and lifting means located in one of said chambers at a higher level than said valve means and being operatively connected to said valve means for raising the same during boiling of a liquid in said heating chamber, so that boiling liquid will then flow out through said opening in said bottom wall of said vessel.

21. A device for supplying a hot liquid, comprising, in combination, a vessel having a bottom wall formed with an outlet opening; partition means arranged in said vessel over and spaced from said bottom wall thereof so as to divide the interior of said vessel into a heating chamber located beneath said partition means and a liquid storing chamber located over said partition means, said partition means having a portion thereof formed with an opening passing therethrough and having a tubular portion extending about said opening and downwardly toward said bottom wall so that said chambers communicate with each other through said tubular portion of said partition means and so that when a liquid in said heating chamber is heated an insulating layer of steam will automatically be formed in said heating chamber about said tubular portion of said partition means and directly beneath said partition means; a valve member located in said heating chamber and resting by gravity on said bottom wall over said outlet opening thereof to close said outlet opening; a connecting portion connected to said valve member and extending upwardly therefrom; and lifting means located in one of said chambers and being operatively connected to said connecting portion for raising the latter and said valve member therewith during boiling of a liquid in said heating chamber, so that the boiling liquid will then flow out through said outlet opening in said bottom wall of said vessel.

References Cited in the file of this patent

UNITED STATES PATENTS

| Number | Name | Date |
|---|---|---|
| 743,571 | Scanlan | Nov. 10, 1903 |
| 787,909 | Fox | Apr. 25, 1905 |
| 1,338,760 | Wells | May 4, 1920 |
| 1,681,377 | Stack | Aug. 21, 1928 |
| 1,735,415 | Spinney et al. | Nov. 12, 1929 |
| 1,755,964 | Morris | Apr. 22, 1930 |
| 1,916,228 | Lucia | July 4, 1933 |
| 2,021,551 | Koehn | Nov. 19, 1935 |
| 2,115,601 | Whitby et al. | Apr. 26, 1938 |
| 2,306,921 | Wilcox | Dec. 29, 1942 |
| 2,411,675 | Alexander | Nov. 26, 1946 |
| 2,478,836 | Riley | Aug. 9, 1949 |
| 2,523,261 | Alvarez et al. | Sept. 26, 1950 |

FOREIGN PATENTS

| Number | Country | Date |
|---|---|---|
| 7,622 | Great Britain | of 1907 |
| 11,245 | Great Britain | of 1910 |
| 1,108 | Great Britain | of 1913 |
| 218,796 | Great Britain | July 17, 1924 |
| 258,108 | Great Britain | Sept. 16, 1926 |